(12) United States Patent
Vieille

(10) Patent No.: US 11,892,612 B2
(45) Date of Patent: Feb. 6, 2024

(54) MULTICHANNEL CLOSE-UP IMAGING DEVICE

(71) Applicant: Depixus, Paris (FR)

(72) Inventor: Thibault Vieille, Villepreux (FR)

(73) Assignee: Depixus

( * ) Notice: Subject to any disclaimer, the term of this patent is extended or adjusted under 35 U.S.C. 154(b) by 261 days.

(21) Appl. No.: 17/424,330

(22) PCT Filed: Jan. 24, 2020

(86) PCT No.: PCT/EP2020/051812
§ 371 (c)(1),
(2) Date: Jul. 20, 2021

(87) PCT Pub. No.: WO2020/152351
PCT Pub. Date: Jul. 30, 2020

(65) Prior Publication Data
US 2022/0091401 A1 Mar. 24, 2022

(30) Foreign Application Priority Data
Jan. 24, 2019 (EP) ..................................... 19305096

(51) Int. Cl.
*G02B 17/08* (2006.01)
*G02B 5/10* (2006.01)
*G02B 17/00* (2006.01)
(52) U.S. Cl.
CPC ............. *G02B 17/084* (2013.01); *G02B 5/10* (2013.01); *G02B 17/002* (2013.01)

(58) Field of Classification Search
CPC ...... G02B 17/084; G02B 5/10; G02B 17/002; G02B 17/0652; G02B 17/0856; G02B 13/24–13/26
(Continued)

(56) References Cited

U.S. PATENT DOCUMENTS 3,455,623 A 7/1969 Harris
3,527,526 A * 9/1970 Silvertooth ........ G02B 17/0856
359/859

(Continued)

FOREIGN PATENT DOCUMENTS

EP 0433613 A1 6/1991
JP 85742014 A 3/1982
(Continued)

OTHER PUBLICATIONS

Albero, J. et al., "Wafer-level fabrication of multi-element glass lenses: lens doublet with improved optical performances," Optics Letters, Dec. 2015, pp. 96-99, vol. 41, No. 1. XP055604679.
(Continued)

*Primary Examiner* — Zachary W Wilkes
(74) *Attorney, Agent, or Firm* — Lerner David LLP

(57) ABSTRACT

A device for optically imaging at least a part of an object, the device having an optical axis and including a two-dimensional first array of first microlenses, having a first side intended to face the object, and a second side, opposite the first side, a two-dimensional second array of second microlenses, each first microlens being aligned with a second microlens on an axis parallel to the optical axis, wherein each first microlens comprises a first catoptric system, and preferably a first catadioptric system.

15 Claims, 4 Drawing Sheets

(58) Field of Classification Search
USPC .................. 351/741; 359/618–640, 354–366
See application file for complete search history.

(56) References Cited

U.S. PATENT DOCUMENTS

| | | | | |
|---|---|---|---|---|
| 3,814,504 | A | * | 6/1974 | Brady .................. G02B 17/086 359/627 |
| RE28,162 | E | * | 9/1974 | Anderson .............. G03B 17/48 396/327 |
| 4,272,152 | A | * | 6/1981 | Shafer ................ G02B 17/0852 359/366 |
| 4,277,129 | A | * | 7/1981 | Taucher ............. G02B 19/0028 126/690 |
| 4,812,030 | A | * | 3/1989 | Pinson ............... G02B 17/0694 359/877 |
| 4,982,222 | A | | 1/1991 | Rees |
| 7,347,572 | B1 | * | 3/2008 | Valenzuela .............. C25D 3/48 205/70 |
| 2011/0242528 | A1 | * | 10/2011 | Hwang ................ G02B 17/084 359/730 |
| 2015/0153551 | A1 | * | 6/2015 | Kobori ................. G02B 17/008 359/534 |
| 2016/0252734 | A1 | * | 9/2016 | Rossi ..................... G02B 17/08 348/340 |
| 2016/0269667 | A1 | | 9/2016 | Ono |

FOREIGN PATENT DOCUMENTS

| | | | | |
|---|---|---|---|---|
| JP | 2018109673 | * | 7/2018 | ......... A61B 1/00082 |
| JP | 2018109673 A | | 7/2018 | |
| WO | WO-2014013412 A1 | * | 1/2014 | ......... A61B 1/00082 |

OTHER PUBLICATIONS

Baranski, M. et al., "Miniature Schwarzschild objective as a microoptical component free of main aberrations: concept, design, and first realization with silicon-glass micromachiningn," Applied Optics, Mar. 2016, pp. 2771-2779, vol. 55, No. 10. XP055603443.

Internationsl Search Report for Application No. PCT/EP2020/051812 dated Apr. 20, 2020, pp. 1-3.

Völkel, R. et al., "Microlens array imaging system for photolithography," Optical Engineering, Jun. 1996, pp. 3323-3330, vol. 35 (11).

* cited by examiner

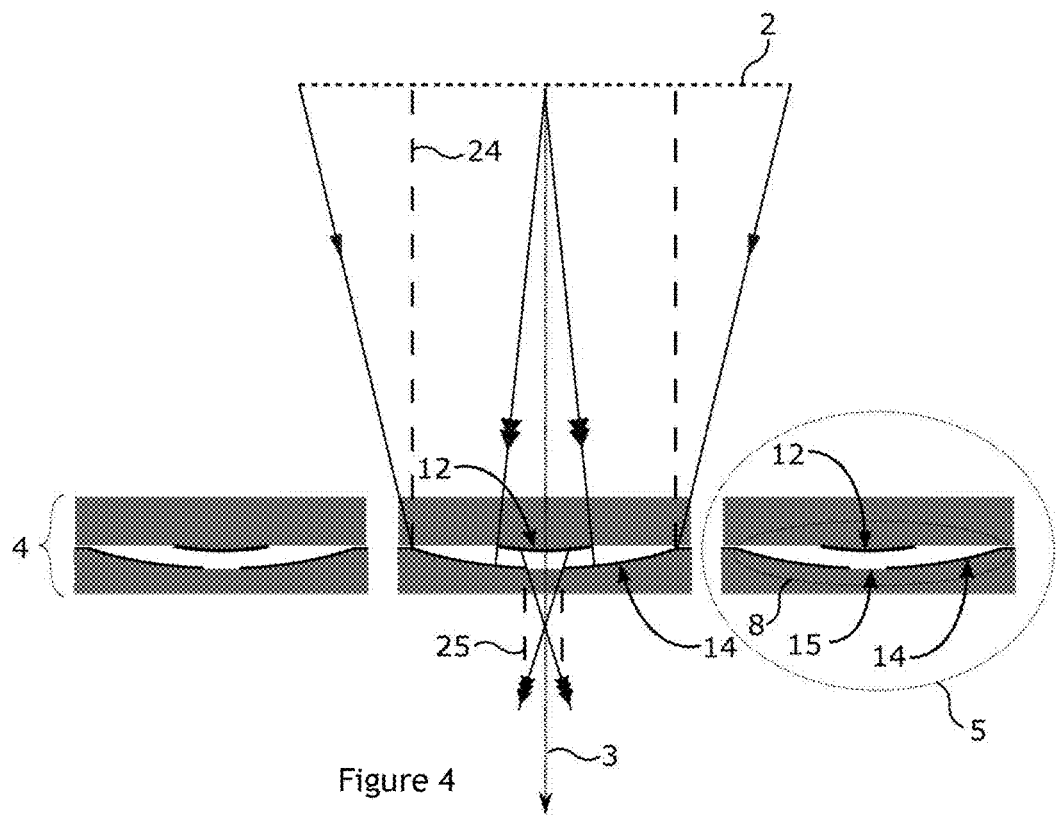
Figure 4
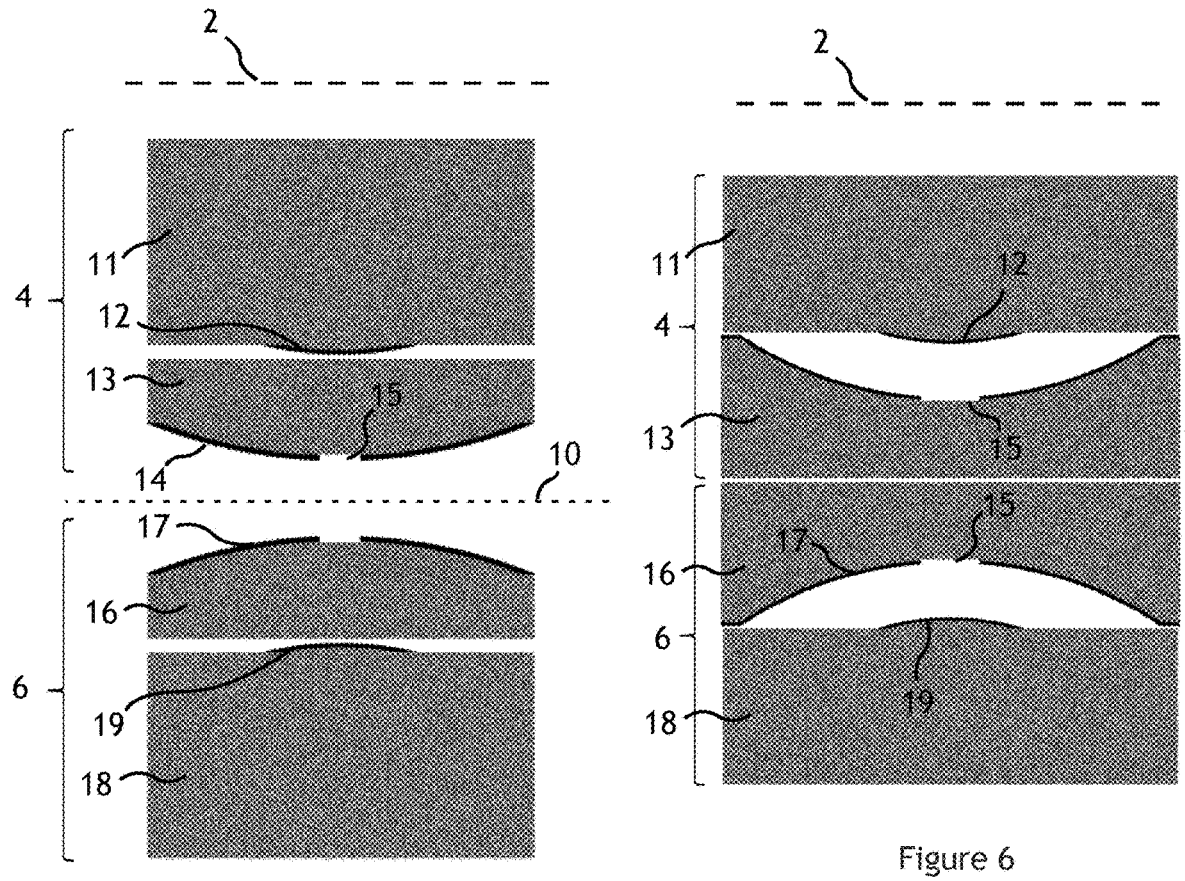
Figure 5
Figure 6

MULTICHANNEL CLOSE-UP IMAGING DEVICE

CROSS-REFERENCE TO RELATED APPLICATIONS

The present application is a national phase entry under 35 U.S.C. § 371 of International Application No. PCT/EP2020/051812 filed Jan. 24, 2020, which claims priority from European Patent Application No. 19305096.0 filed Jan. 24, 2019, all of which are hereby incorporated herein by reference.

TECHNICAL FIELD

The present invention relates to a multichannel imaging device, aimed at close-up imaging, i.e. imaging an object arranged at close distance as compared to the size of the device.

BACKGROUND OF THE INVENTION

Compact imaging systems for close-up imaging having a large field of view are increasingly used in the fields of industrial vision, quality check, and document imaging, like in laboratory operations such as inspection of clinical samples.

An imaging device for close-up imaging typically comprises an object lens having a large diameter as compared to classic optics, for example comprised between 10 mm and 40 mm, so as to image a field of view corresponding to a surface of about one square centimeter or more. However, this device requires sophisticated and expensive lenses.

U.S. Pat. No. 4,982,222 discloses a system comprising an array of gradient index optical fibers arranged in a row. A mechanical transverse scanning of the object by the array is compulsory to record a two-dimensional image. A significant drawback of this system is then a need for a stable mechanical structure for moving the array. Moreover, the gradient index optical fibers are not transparent to UV illumination, limiting their utility in applications such as the observation of UV fluorescent dyes or UV photolithography.

U.S.RE28162 discloses an imaging system comprising a first two-dimensional array of lenses for imaging an object and a second two-dimensional array of lenses. Each lens of the first array is aligned with a respective lens of the second array, so as to form an array of optical channels. The image generated by the first array of lenses can then be reconstructed by the second array of lenses. Each array of lenses, referred to as a "lens mosaic", is made by molding a plastic transparent material. A portion of the object can be imaged by each optical channel. A complete image, formed with a large field of view, is thus obtained by the addition of the individual images generated by the different channels.

Völkel et al. (Völkel, R., Herzig, H. P., Nussbaum, P., Daendliker, R., & Hugle, W. B., 1996, *Microlens array imaging system for photolithography. Optical Engineering*, 35(11), 3323-3331) discloses a system also comprising superimposed lens arrays but having miniaturized lenses, the array having a lower pitch as compared to the lens array of U.S. RE28162. Each lens of the array is made by melting resist on a glass substrate. An object, corresponding to a large field of view relative to the optical system, having for example a surface of 20×20 mm², can be imaged with this system, with a resolution of However, the systems disclosed in U.S.RE28162 and in Völkel et al. are subject to optical crosstalk between adjacent optical channels of the array, leading to image alteration.

Referring to FIG. 1, an optical system of the prior art can comprise one optical channel 20. The optical channel 20 has an optical axis 3 and a first lens 21. The numerical aperture NA of the optical system is defined by both the wall of the system, which is arranged parallel to the optical axis 3, and by the aperture diaphragm $D_{ap}$. Considering an object point $P_1$ located in the object plane $\square_{obj}$, an incident light ray coming from $P_1$, whose propagation direction forms an angle with the optical axis 3 greater than the one allowed by the numerical aperture, is prevented from propagating toward an image plane $\square_i$ by the aperture diaphragm $D_{ap}$. Considering an object $P_2$ also located in the object plane $\square_{obj}$, an incident light ray coming from $P_2$ whose propagation direction forms an angle with the optical axis 3 greater the angle of an incident light ray when coming from $P_1$, is no longer stopped by the aperture diaphragm but by the wall of the optical system. Thus, the aperture diaphragm $D_{ap}$ acts as a bandpass angular filter while the combination of the aperture diaphragm and the wall defines a true lowpass angular filter. The field of view can also be limited with a field diaphragm $D_{F1}$, as can be seen for the optical rays emitted by the object point $P_1$.

Referring to FIG. 2, another optical device of the prior art can comprise several superposed lens arrays. The optical device is subjected to crosstalk between the different optical channels 20. A lens array 23 commonly comprises lenses covering a substrate made of a transparent material. Contrary to the optical system illustrated in FIG. 1, the optical system illustrated in FIG. 2 has no absorptive walls between the neighboring optical channels 20. Considering an object $P_3$ located in the object plane $\square_{obj}$, when the light ray emitted by $P_3$ is propagating toward the optical system following an angle with the optical axis 3 lower than a predetermined angle, the light ray propagates through the optical device in the same optical channel 20. For example, under the predetermined angle, a light ray from $P_3$ propagates through the optical channels $ch_0$ or $ch_1$, and the image $P'_3$ of $P_3$ is correctly made on the image plan $\square_i$. Over the predetermined angle, as illustrated by the light ray (a), crosstalk occurs between neighboring optical channels 20 and an image of $P_3$ cannot be correctly obtained, resulting in an alteration of the overall image of the object.

Therefore, optical devices of the prior art usually comprise collimation systems in order to pre-filter, i.e. not emit the light having high angular frequencies at the entrance of the optical device. This solution has several disadvantages: it does not result in a system having a high numerical aperture and is not adapted for imaging objects emitting an isotropic light, such as fluorescent objects (which are often used in biological microscopy).

Referring to FIG. 3, the crosstalk between adjacent optical channels 20 can be partially limited by adding several diaphragms 22 in and/or over the different lens arrays to partially reconstruct a lowpass angular filter. This solution is sufficient to remove crosstalk only for low aperture imaging systems. However, it is not adapted for imaging objects emitting an isotropic light, such as fluorescent objects. The light rays having angular frequencies beyond a predetermined limit are indeed not completely filtered. Moreover, the addition of the diaphragms implies a general loss in homogeneity of optical performance, especially resulting in variation of brightness across the image.

BRIEF SUMMARY

A device for optical close-up imaging has been developed to respond at least partially to the above-mentioned drawbacks of the prior art. The device for optically close-up imaging at least a part of an object has an optical axis and comprises:

each first catoptric system or catadioptric system has a magnification less than 0.2, and preferably less than 0.1,
a two-dimensional first array of first catoptric systems and/or first catadioptric systems, the first array having a first side intended to face the object, and a second side opposite the first side,
a two-dimensional second array of second catoptric systems and/or second catadioptric systems,
each first catoptric systems and/or first catadioptric systems, being aligned with a second catoptric systems and/or a second catadioptric system on an axis parallel to the optical axis,
wherein the first array comprises:
   a first slide of transparent material arranged to face the object,
   a first two-dimensional array of thin film secondary mirrors covering the first slide, each secondary mirror being adapted to reflect a light ray coming from a side opposite the object relative to the first slide,
   a second slide of transparent material, the first slide being arranged between the object and the second slide,
   a second two-dimensional array of thin film primary mirrors covering the second slide, each primary mirror being adapted to reflect a light ray coming from a side facing the object relative to the second slide, each primary mirror comprising a hole, said hole being adapted to transmit light reflected by the secondary mirror through the primary mirror, each first catoptric system and/or catadioptric system comprising at least one of the primary mirrors of the second array of thin film primary mirrors and one of the secondary mirrors of the first array of thin film secondary mirrors,
and wherein the second array comprises:
   a third slide of transparent material arranged on a side opposite to the object relative to the first array,
   a third two-dimensional array of thin film quaternary mirrors covering the third slide, each tertiary mirror being adapted to reflect a light ray coming from a side opposite to the first array relative to the third slide,
   a fourth slide of transparent material, the third slide being arranged between the first array and the fourth slide,
   a fourth two-dimensional array of thin film tertiary mirrors covering the fourth slide, each quaternary mirror being adapted to reflect a light ray coming from a side facing the first array relative to the fourth slide,
each quaternary mirror comprising a hole in the quaternary mirror, said hole being adapted to transmit light reflected by the secondary mirror through the quaternary mirror,
each second catoptric system and/or second catadioptric system comprising at least one of the quaternary mirrors of the third array of thin film quaternary mirrors and one of the tertiary mirrors of the fourth array of thin film tertiary mirrors.

In further optional aspects of the present disclosure:
   each first catoptric system and/or first catadioptric system is configured for having a predetermined field of view, each first catoptric system and/or first catadioptric system forming a first optical channel having a diameter $D_{ch1}$, a size of the field of view being strictly greater than the diameter $D_{ch1}$ of the first optical channel, and preferably 5 times greater than the diameter $D_{ch1}$ of the first optical channel so that multiple optical channels are adapted for imaging the same object point,
   the first array of first catoptric systems and/or first catadioptric systems is arranged between the second array of second catoptric systems and/or second catadioptric systems and the object,
   each first catoptric systems and/or first catadioptric systems, and a second catoptric systems and/or a second catadioptric system aligned with first catoptric systems and/or first catadioptric systems form a unitary optical system, and the first catoptric systems and/or first catadioptric systems, and the second catoptric systems and/or second catadioptric systems of the unitary optical system are symmetrical relative to a plane perpendicular to the optical axis,
   each primary mirror covers a surface of the second slide opposite to the object relative to the second slide, and each secondary mirror covers a surface of the first slide opposite to the object relative to the first slide,
   each primary mirror covers a surface of the second slide facing the object, and each secondary mirror covers a surface of the first slide opposite to the object relative to the first slide.
   the primary mirrors are concave and the secondary mirrors are convex,
   the primary mirrors and the secondary mirrors are concave,
   the device comprises a dioptric microlens arranged between the primary mirror and the secondary mirror,
   the dioptric microlens covers a surface of the secondary mirror,
   the device comprises a positive dioptric microlens arranged in the hole of the primary mirror of the first array.

Another aspect of the present disclosure is the use of the device according to an embodiment of the present disclosure for imaging an object emitting an isotropic light, preferably for imaging a fluorescent object.

BRIEF DESCRIPTION OF THE DRAWINGS

The invention will be described by way of example, with reference to the accompanying drawings in which.

DEFINITIONS

Figures 1, 2, 3:
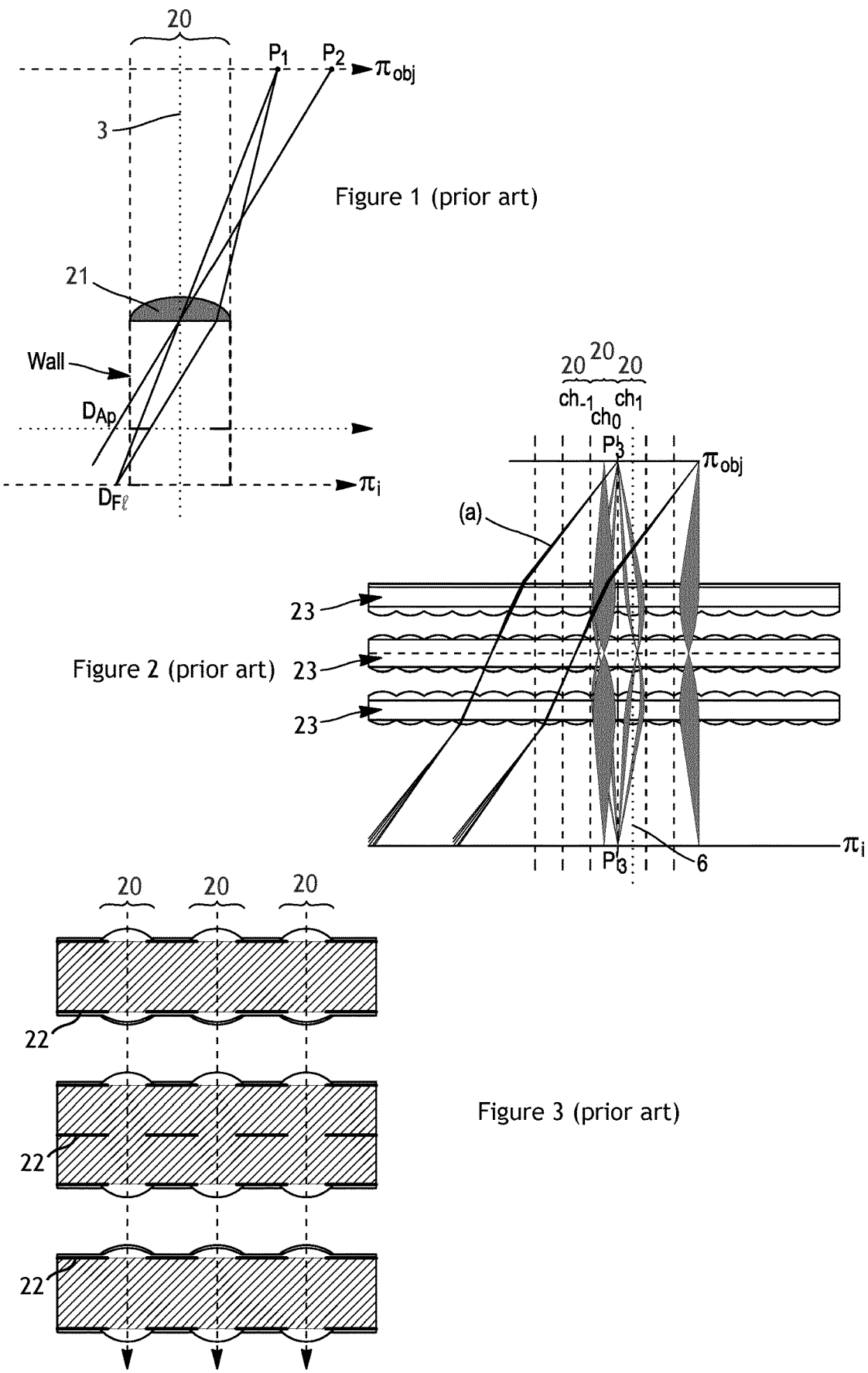
FIG. 1 diagrammatically illustrates a single optical channel of the prior art,
FIG. 2 diagrammatically illustrates another multichannel close-up optical device from the prior art wherein each lens array comprises a transparent substrate,
FIG. 3 diagrammatically illustrates a multichannel close-up imaging device from the prior art comprising diaphragms,
FIG. 4 diagrammatically illustrates an optical device according to an embodiment of the invention comprising an array of catoptric first lenses,
FIG. 5 diagrammatically illustrates an optical device according to an embodiment of the invention comprising two lenses, each lens comprising a Cassegrain combination of two reflectors,
FIG. 6 diagrammatically illustrates an optical device according to an embodiment of the invention comprising two lenses, each lens comprising another Cassegrain combination of two reflectors,
FIG. 7 diagrammatically illustrates an optical device according to an embodiment of the invention comprising two lenses, each lens comprising a Gregorian combination of reflectors,
FIG. 8 diagrammatically illustrates an optical device according to an embodiment of the invention comprising two lenses, each lens comprising a Newtonian combination of reflectors and dioptric lens, FIG. 9 diagrammatically illustrates an optical device according to an embodiment of the invention comprising two lenses, each lens comprising another Cassegrain combination of reflectors, FIG. 10 diagrammatically illustrates an optical device according to an embodiment of the invention comprising two lenses, one of the lenses comprising another Cassegrain combination of reflectors, FIG. 11 diagrammatically illustrates an optical device according to an embodiment of the invention comprising two lenses, each lens comprising a Gregorian combination of reflectors, and FIG. 12 diagrammatically illustrates an optical device according to an embodiment of the invention comprising two lenses, one of the lenses comprising another Cassegrain combination of reflectors.

The term "catoptric system" will be used herein to designate an optical system comprising at least two mirrors adapted to form an image of an object.

The term "catadioptric system" will be used herein to designate an optical system comprising at least two mirrors in combination with a refraction-based dioptric lens, said catadioptric system being adapted to form an image of an object.

The term "lens" will be used herein to designate an optical system adapted to focus or to disperse a light ray by means of refraction (using a dioptric system), or reflection (using a catoptric system), or both.

The term "convex" will be used herein to designate an object having a surface which has a protruding curvature relative to an incident light ray. Consequently, the terms "convex mirror" herein designate a mirror adapted to diverge a light ray, while the terms "convex dioptric lens" herein designate a dioptric lens adapted to converge a light ray.

The term "concave" will be used herein to designate an object having a surface which has a grooving curvature relative to an incident light ray. Consequently, the terms "concave mirror" herein designate a mirror adapted to converge a light ray, while the terms "concave dioptric lens" herein designate a dioptric lens adapted to diverge a light ray.

The term "positive" lens, respectively "negative" lens, will be used herein to designate a lens adapted to converge an incident light ray, respectively to diverge an incident light ray.

The term "microlens" will be used herein to designate a lens having a diameter lower than 2 mm, notably lower than 500 μm, and preferably lower than 300 μm.

The term "transparent" will be used herein to designate a material absorbing less than 50% of the energy of light rays in the visible range, preferably without changing the wavelength of said rays.

DETAILED DESCRIPTION

Referring to FIG. 4, the optical device 1 according to an embodiment is adapted to image at least a part of an object 2. The device 1 may be adapted for close-up imaging. Close-up imaging refers to imaging of an object arranged at a close distance from the optical device 1, such as a distance that is less than 2 cm from the optical device 1 or less than 1 cm.

The device 1 has an optical axis 3 along which different components of the optical device are aligned. The device 1 comprises at least a two-dimensional first array 4 of first microlenses 5. The two-dimensional first array 4 may form a plane perpendicular to the optical axis 3, each of the first microlenses 5 being aligned on an axis parallel to the optical axis 3. The first array 4 has a first side intended to face the object 2, and a second side opposite the first side.

Each of the first array 4 comprises at least a first catoptric system 8, and preferably a first catadioptric system. The first catoptric system comprises preferably at least two reflective components: a primary mirror 14 and a secondary mirror 12. Each mirror (primary mirror 14 or secondary mirror 12) has an optical axis aligned with the optical axis 3.

Each first microlens 5 defines a first optical channel 24, coming from the object 2 to the first microlens 5. The first optical channel 24 has a diameter $D_{ch1}$. Each first microlens 5 also forms a second optical channel 25 from the side of the first microlens 5 opposite the object 2 toward a direction opposite the object 2. The second optical channel 25 has a diameter $D_{ch2}$. The first catoptric system allows forming a second optical channel 25 having a diameter $D_{ch2}$ inferior to the diameter $D_{ch1}$, preferably smaller than 0.3 times $D_{ch1}$. These conditions between diameters of the optical channels allow for avoiding crosstalk between the different adjacent optical channels of adjacent first microlenses 5. Moreover, the first catoptric system allows for a shortened focal length of the first microlens 5 compared with a pure dioptric microlens 5. Hence, it is possible to form an intermediate image from the first microlens 5 smaller than an intermediate image formed by a pure dioptric microlens. Finally, the first microlens 5 comprising the first catoptric system allows for increasing the field of view of the optical device 1 compared with an optical device 1 comprising an array of pure dioptric lenses facing the object 2. The shortened focal length and increased field of view allows for increasing the number of first catoptric systems and/or catadioptric system adapted for imaging a single object point, and then increasing the resolution of an image while avoiding ghost image resulting from crosstalk. The first catoptric system and/or the first catadioptric system have preferably a magnification less than 0.2, and preferably less than 0.1, so that the total resolution of the imaging stem can be increased.

In a preferred embodiment of the present disclosure, the first catoptric system and/or the first catadioptric system is configured for having field of view. A dimension of the field of view is greater than the diameter $D_{ch1}$ of the first optical channel, and may be 5 times greater than the diameter $D_{ch1}$ of the first optical channel. Multiple optical channels are then allowed for imaging the same object point.

Another aspect of the present disclosure is the use of the device 1 for imaging an object 2 emitting an isotropic light, and preferably for imaging a fluorescent object. The fluorescent object can be, for example, a fluorescent dye or a fluorophore. Because the optical device 1 allows for imaging the object 2 with a wider field of view compared with optical devices of the prior art, the use of the device 1 is particularly adapted for imaging an object emitting an isotropic light. Preferably, the device 1 is used for imaging a set of fluorescent dyes arranged in the object plane of the device.

The optical device 1 comprises a two-dimensional array 6 of second microlenses 7. The two-dimensional second array 6 may form a plane perpendicular to the optical axis 3, each of the second microlenses 7 being aligned on an axis parallel to the optical axis 3. Each second microlens 7 is aligned with a first microlens 5 on an axis parallel to the optical axis 3, forming a unitary optical system comprising the first microlens 5 and the second microlens 7. Each second microlens 7 can be chosen between at least a pure dioptric microlens and a catoptric microlens, preferably a catadioptric microlens.

Referring to FIG. 5, the first array 4 can comprise a first slide 11 of transparent material arranged to face the object 2. The first slide 11 can be for example a glass slide or a glass wafer.

The first array 4 can further comprise a first two-dimensional array of thin film secondary mirrors 12, each secondary mirror 12 covering the first slide 11. The two-dimensional array of thin film secondary mirrors 12 may form a plane perpendicular to the optical axis 3.

Each secondary mirror 12 is adapted to reflect at least a light ray coming from a side opposite the object 2 relative to the first slide 11. The mirrors of the different embodiments of the invention can be fabricated by standard microlens fabrication and deposition processes, comprising for example melting resist technology, imprint technology, and/or deposition processes. An array of secondary mirrors 12 can be fabricated for example by lift-off deposition of a thin reflective material layer, preferably a thin metal layer. The metal used for the fabrication of the mirrors may be selected from aluminium, silver, and/or gold.

The first array 4 can further comprise a second slide 13 of transparent material, the first slide 11 being arranged between the object 2 and the second slide 13. A second two-dimensional array of thin film primary mirrors 14 covers the second slide 13. Each primary mirror 14 is adapted to reflect a light ray coming from a side facing the object 2 relative to the second slide 13. Each primary mirror 14 comprises a hole 15, said hole 15 being adapted to transmit light reflected by the secondary mirror 12 through the primary mirror 14. The hole 15 may be fabricated in the center of the primary mirror 14.

The first slide 11, the first array of secondary mirrors 12, the second slide 13 and the second array of secondary mirrors 14 allow to fabricated the two-dimensional first array 4 of first microlenses 5, each first microlens 5 comprising a catoptric system. The catoptric system comprises the primary mirror 14 and the secondary mirror 12. Referring to FIG. 5, each first microlens 5 can then be designed as a Cassegrain reflector.

The optical device 1 can also comprise a third slide 16 of transparent material arranged on a side opposite to the object 2 relative to the first array 4. The third slide 16 can be for example a glass slide or a glass wafer.

A third two-dimensional array of thin film quaternary mirrors 17 can cover the third slide 16. The two-dimensional array of thin film quaternary mirrors 17 may form a plane perpendicular to the optical axis 3. Each quaternary mirror 17 is adapted to reflect at least a light ray coming from a side opposite the object 2 relative to the third slide 16.

The optical device 1 can further comprise a fourth slide 18 of transparent material, the third slide 16 being arranged between the first array 4 and the fourth slide 18. A fourth two-dimensional array of thin film tertiary mirrors 19 covers the fourth slide. Each tertiary mirror 19 is adapted to reflect a light ray coming from a side facing the object 2 relative to the fourth slide 18. Each tertiary mirror 17 comprises a hole 15, said hole 15 being adapted to transmit light reflected by the secondary mirror 12 through the primary mirror 14.

The third slide 16, the third array of quaternary mirrors 17, the fourth slide 18 and the fourth array of tertiary mirrors 17 allow to fabricate the two-dimensional second array 6 of second microlenses 7, each second microlens 7 comprising a second catoptric system. The second catoptric system comprises the tertiary mirror 19 and the quaternary mirror 17. In reference to FIG. 5, each second microlens 7 can be then designed as a Cassegrain reflector. The magnification of the second catoptric and/or catadioptric system may be higher than 5 and preferably higher than 10. Having a second catoptric system and/or a second catadioptric system instead of a pure refractive second lens allows for increasing the resolution of the image obtained by the device, by allowing having a first catoptric and/or catadioptric system with a low magnification. The increase in resolution can be obtained by avoiding ghost images resulting from crosstalk. It consequently also allows having a plurality of optical channels participating in the imaging of one object point, preferably more than 4 and notably more than 9 optical channels. It also allows to increase the global numerical aperture of the device, the global numerical aperture being composed by the segmented assembly of individual numerical apertures of each optical channel, while minimizing the formation of ghost images.

In an embodiment of the present disclosure, the first microlens 5 and the second microlens 7 of the unitary optical system are symmetrical relative to a plane 10 perpendicular to the optical axis 3. Because of the symmetry between the catoptric first microlens 5 and the catoptric second microlens 7, it is possible to remove comatic aberrations of the optical device 1, like coma and distortion.

The mirrors (e.g., the primary mirror 14 and/or the secondary mirror 12 and/or the tertiary mirror 19 and/or the quaternary mirror 17) can have a reflective surface forming a spherical surface or an aspherical surface. A mirror having a reflective surface forming an aspherical surface allows to mitigate, preferably to avoid, spherical aberration.

Each primary mirror 14 can cover a surface of the second slide opposite to the object 2 relative to the second slide 13, and each secondary mirror 12 can cover a surface of the first slide opposite to the object 2 relative to the first slide 11.

The first microlenses 5 can be mounted in a Cassegrain design: the primary mirrors 14 of the first array 4 can be concave and the secondary mirrors 12 of the first array 4 can be convex.

In reference to FIG. 6, each primary mirror 14 can cover a surface of the second slide 13 facing the object 2, and each secondary mirror 12 can cover a surface of the first slide 11 opposite to the object 2 relative to the first slide 11.

Figure 7:
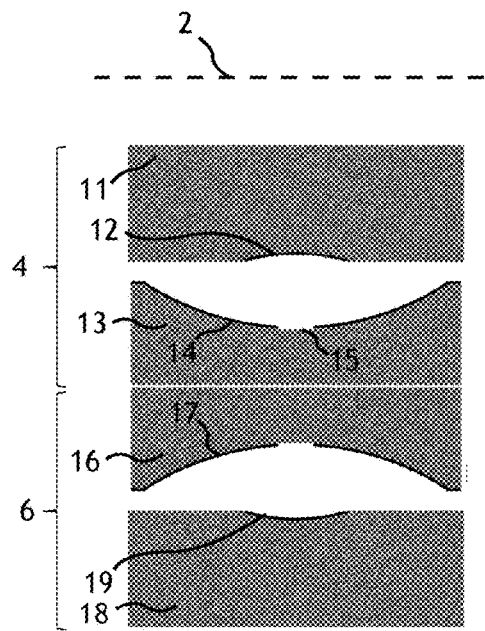

In reference to FIG. 7, both the primary mirrors 14 and the secondary mirrors 12 can be concave. Then, each first microlens 5 comprises a catoptric system mounted in a Gregorian design. A Gregorian design allows an intermediate image plane of the device 1 to be shifted away from the object 2 along the optical axis 3 compared to a Cassegrain design.

Figure 8:
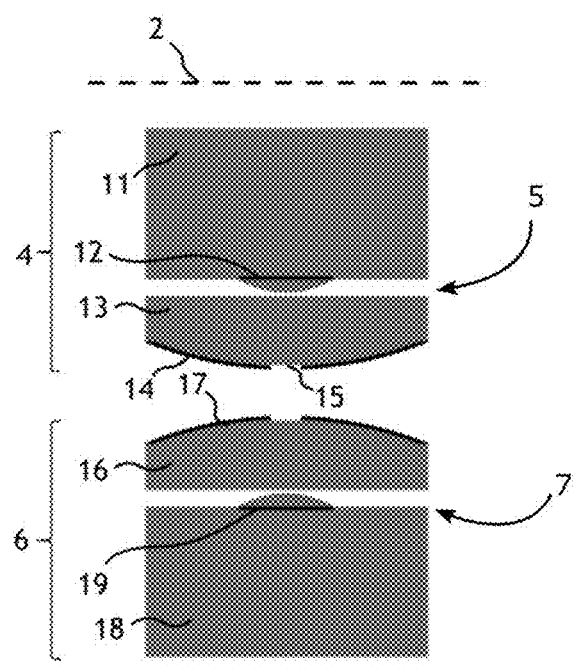

In reference to FIG. 8, each first microlens 5 can comprise a dioptric microlens, preferably a pure dioptric microlens arranged between the primary mirror 14 and the secondary mirror 12. Each first microlens 5 can be mounted in a Newtonian design. The primary mirrors 14 can be concave and the secondary mirrors 12 can be flat. The secondary mirrors 12 cover the side of the first slide 11 opposite the object 2 relative to the first slide 11, and a positive pure dioptric microlens covers each secondary mirror 12.

Figure 9:
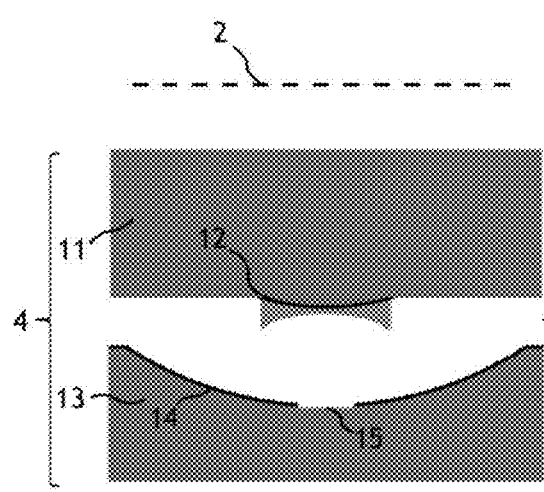

In reference to FIG. 9, each of the first microlenses 5 can be mounted in a Cassegrain catadioptric design. The primary mirrors 14 can be concave and the secondary mirrors 12 can be convex. The secondary mirrors 12 cover the side of the first slide 11 opposite the object 2 relative to the first slide 11, and a negative pure dioptric microlens covers each secondary mirror 12. This configuration allows the intermediate image plane 10 to be shifted away from the object 2 along the optical axis 3, and to reduce the obturation ratio compared to other Cassegrain configurations.

Figure 10:
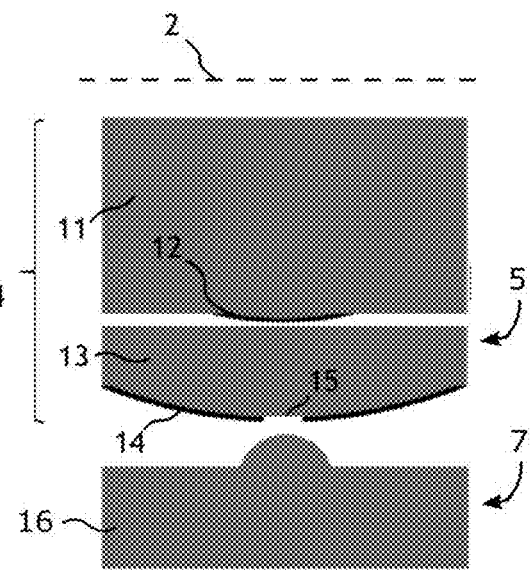

In reference to FIG. 10, each second microlens 7 can be a dioptric microlens, preferably comprising a third slide 16 of transparent material and a positive microlens covering a side of the third slide 16 facing the object 2 relative to the third slide 16. For example, the first microlens 5 can be mounted in a Cassegrain design, i.e. the primary mirrors 14 of the first array 4 can be concave and the secondary mirrors 12 of the first array 4 can be convex. The second microlenses 7 can be pure dioptric positive microlenses. Preferably, each second microlens 7 can be a collimator assembly of pure dioptric microlenses.

Figure 11:
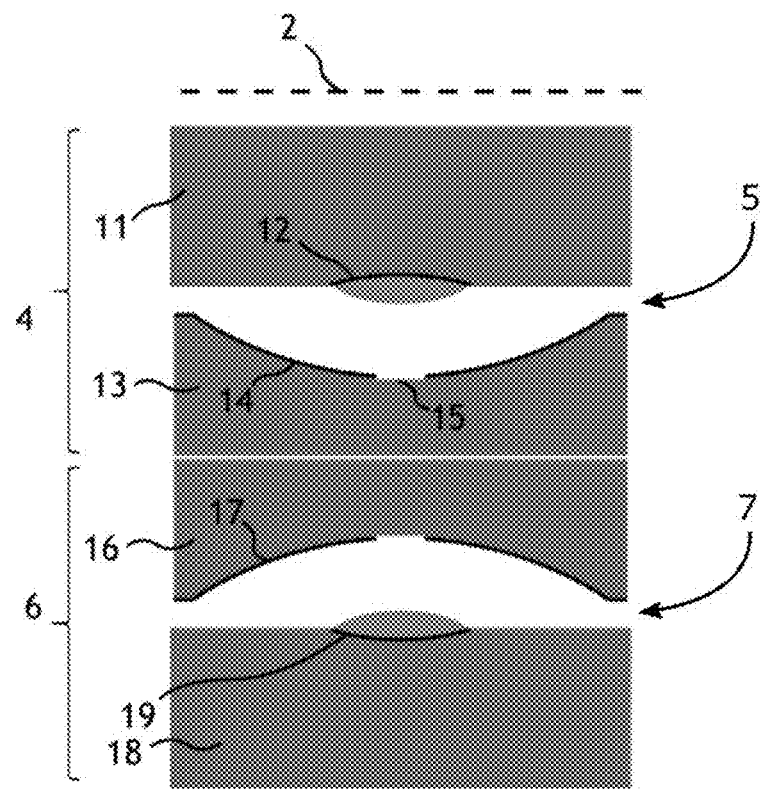

In reference to FIG. 11, the first microlenses 5 can be mounted in a Gregorian design, the primary mirrors being concave, the secondary mirrors being also concave and each secondary mirror being covered by a positive pure dioptric microlens, on the side opposite the object 2 relative to the first slide 11. This configuration allows for the intermediate image plane 10 to be shifted away from the object plane 2 along the optical axis 3, and to reduce the obturation ratio compared to Cassegrain configurations.

Figure 12:
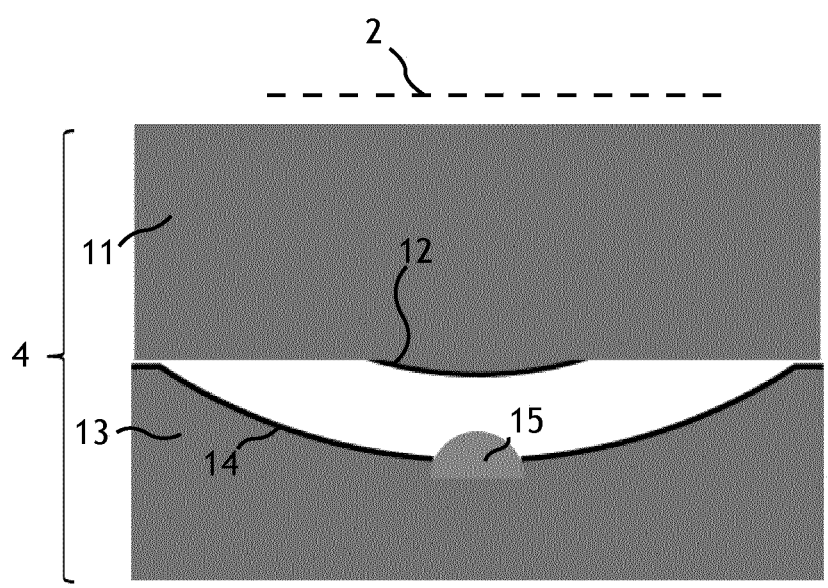

In reference to FIG. 12, each second microlens 7 can comprise a positive dioptric microlens arranged in the hole 15 of the primary mirror 14 of the first array 4. The first microlenses 5 can for example be mounted in a Cassegrain design, the first mirrors 14 being concave, the second mirrors 12 being convex, and the second microlenses 7 comprising a positive pure dioptric microlens inserted in the hole 15.

In any embodiment of the present disclosure, each unitary optical system can comprise both a positive microlens and a micronegative lens, so as to minimize or to avoid the Petzval effect. This allows the imaging device 1 to form a flat-field image of the object 2.

The invention claimed is:

1. A device for optically close-up imaging at least a part of an object, the device having an optical axis and comprising:
   a first array of catoptric systems or catadioptric systems, the first array comprising:
   a first slide of transparent material absorbing less than 50% of energy of light rays in the visible range;
   a second slide of transparent material disposed adjacent the first slide of transparent material;
   a first plurality of mirrors disposed on the first slide; and
   a second plurality of mirrors disposed on the second slide, wherein:
   each of the first plurality of mirrors is configured to reflect a light ray directed toward the first slide by the second plurality of mirrors,
   each mirror of the second plurality of mirrors comprises a hole, the hole configured to transmit the light ray reflected by the first plurality of mirrors therethrough, and
   each catoptric system or catadioptric system of the first array comprises a mirror of the first plurality of mirrors and a mirror of the second plurality of mirrors; and
   a second array of catoptric systems or catadioptric systems, the second array comprising:
   a third slide of transparent material disposed adjacent the second slide such that the second slide is disposed between the first slide and the third slide;
   a fourth slide of transparent material disposed adjacent the third slide of transparent material such that the third slide is disposed between the second slide and the fourth slide;
   a third plurality of mirrors disposed on the third slide; and
   a fourth plurality of mirrors disposed on the fourth slide, wherein:
   each mirror of the third plurality of mirrors comprises a hole, the hole configured to transmit the light ray reflected by the first plurality of mirrors therethrough,
   each mirror of the fourth plurality of mirrors is configured to reflect the light ray from reflected by the first plurality of mirrors through the hole of the third plurality of mirrors, each mirror of the third plurality of mirrors being configured to reflect the light ray reflected by the fourth plurality of mirrors; and
   each catoptric system or catadioptric system of the second array comprises a mirror of the third plurality of mirrors and a mirror of the fourth plurality of mirror.

2. The device of claim 1, wherein each of the mirrors of the first plurality of mirrors, the second plurality of mirrors, the third plurality of mirrors, and the fourth plurality of mirrors is a thin film mirror.

3. The device of claim 1, wherein each of the catoptric systems or the catadioptric systems of the first array has a magnification less than 0.2.

4. The device of claim 1, wherein each of the catoptric systems or the catadioptric systems of the first array is configured to image a part of the object, the part of the object having a maximum size greater than a diameter $D_{ch1}$ of each mirror of the second plurality of mirrors.

5. The device of claim 4, wherein the maximum size is 5 times greater than the diameter $D_{ch1}$ of each mirror of the second plurality of mirrors so that multiple optical channels are adapted for imaging the same object point.

6. The device of claim 1, wherein a catoptric system or catadioptric system of the first array is aligned with a catoptric system or catadioptric system of the second array to form a unitary optical system, the unitary optical system being symmetrical relative to a plane extending perpendicular to the optical axis and extending between the second slide and the third slide.

7. The device of claim 1, wherein:
   each mirror of the second plurality of mirrors is disposed on a surface of the second slide that faces the third slide, and
   each mirror of the first plurality of mirrors is disposed on a surface of the first slide that faces the second slide.

8. The device of claim 1, wherein:
   each mirror of the second plurality of mirrors is disposed on a surface of the second slide facing the first slide, and
   each mirror of the first plurality of mirrors is disposed a surface of the first slide facing the second slide.

9. The device of claim 1, wherein each mirror of the plurality of second mirrors is concave and each mirror of the plurality of first mirrors is convex.

10. The device of claim 1, wherein each mirror of the plurality of first mirrors and the plurality of second mirrors is concave.

11. The device of claim 1, further comprising a dioptric lens arranged between a mirror of the first plurality of mirrors and a mirror of the second plurality of mirrors, the dioptric lens having a diameter lower than 2 mm.

12. The device of claim 11, wherein the dioptric lens covers a surface of a mirror of the first plurality of mirrors.

13. The device of claim 1, further comprising a positive dioptric lens arranged in the hole of the mirrors of the first plurality of mirrors, the dioptric lens having a diameter lower than 2 mm.

14. A method of using a device for optically close-up imaging at least a part of an object, comprising:

emitting an isotropic light from an object;

reflecting the isotropic light by a second plurality of mirrors toward a first slide of transparent material, a transparent material absorbing less than 50% of energy of light rays in the visible range, the second plurality of mirrors being disposed on a second slide of transparent material, the second slide being disposed adjacent the first slide;

reflecting the isotropic light directed by the second plurality of mirrors by a first plurality of mirrors disposed on the first slide towards the second slide;

transmitting the isotropic light reflected by the first plurality of mirrors through first holes towards a third slide of transparent material, each first hole being comprised in a mirror of the second plurality of mirrors, the third slide being disposed adjacent the second slide such that the second slide is disposed between the first slide and the third slide;

transmitting through second holes the isotropic light transmitted through the first holes towards a fourth slide of transparent material, each second hole being comprised in a mirror of a third plurality of mirrors disposed on the third slide, the fourth slide being disposed adjacent the third slide such that the third slide is disposed between the second slide and the fourth slide; reflecting the isotropic light transmitted through the second holes by a fourth plurality of mirrors disposed on the fourth slide towards the third slide;

reflecting the isotropic light reflected by the fourth plurality of mirrors by the third plurality of mirrors towards the fourth slide, and obtaining an image of the object.

15. The method of claim 14, wherein the object is a fluorescent object.

* * * * *